United States Patent
Miki et al.

(10) Patent No.: US 8,763,985 B2
(45) Date of Patent: Jul. 1, 2014

(54) PLATE ROTATING DEVICE, EXHAUST PATH OPENING DEGREE CHANGING DEVICE, EXHAUSTED DEVICE, TRANSFER DEVICE, BEAM DEVICE, AND GATE VALVE

(75) Inventors: Masaharu Miki, Suginami-ku (JP); Yoshihiro Enomoto, Yachiyo (JP)

(73) Assignee: Edwards Japan Limited, Chiba (JP)

( * ) Notice: Subject to any disclaimer, the term of this patent is extended or adjusted under 35 U.S.C. 154(b) by 505 days.

(21) Appl. No.: 12/596,686

(22) PCT Filed: Apr. 22, 2008

(86) PCT No.: PCT/JP2008/058291
§ 371 (c)(1),
(2), (4) Date: Oct. 20, 2009

(87) PCT Pub. No.: WO2008/139939
PCT Pub. Date: Nov. 20, 2008

(65) Prior Publication Data
US 2010/0044607 A1    Feb. 25, 2010

(30) Foreign Application Priority Data

Apr. 27, 2007   (JP) ................................ 2007-118398

(51) Int. Cl.
*F16K 25/00*    (2006.01)
*F16K 31/02*    (2006.01)

(52) U.S. Cl.
USPC ...... 251/161; 251/193; 251/129.11; 359/234; 250/492.2

(58) Field of Classification Search
USPC ................. 251/160–161, 193, 129.11, 65; 250/492.1–492.3; 359/227, 234, 236; 378/160
See application file for complete search history.

(56) References Cited

U.S. PATENT DOCUMENTS

| | | | | |
|---|---|---|---|---|
| 3,272,223 | A | * | 9/1966 | Sass .............................. 137/340 |
| 4,013,264 | A | * | 3/1977 | Friedell .......................... 251/56 |
| 4,800,100 | A | * | 1/1989 | Herbots et al. ................ 427/527 |
| 5,333,833 | A | * | 8/1994 | Reinicke ......................... 251/77 |

(Continued)

FOREIGN PATENT DOCUMENTS

| | | |
|---|---|---|
| DE | 3908545 A1 | 9/1990 |
| DE | 3908546 A1 | 9/1990 |

(Continued)

OTHER PUBLICATIONS

Translation of Notice of Reasons for Rejection mailed Mar. 29, 2013 in corresponding JP Application No. JP2009-539545, 5 pgs.

*Primary Examiner* — Eric Keasel
*Assistant Examiner* — David Colon Morales
(74) *Attorney, Agent, or Firm* — Shumaker & Sieffert, P.A.

(57) ABSTRACT

To provide a mechanism in which a moving body can be stored in a housing. A gate valve has a slide plate and a moving mechanism for changing the positions in the radial and axial directions of the slide plate. A shaft is a rotating shaft the axial displacement of which is controlled by an axial driving mechanism and the angle of rotation of which is controlled by a radial driving mechanism, and is turnably supported in the housing by a shaft supporting spring consisting of a magnetic bearing and a conical coil spring. By controlling the attraction force of a balance weight in an electromagnet, the shaft can be moved in the radial direction. Also, by controlling the attraction force of an electromagnet target in the electromagnet, the shaft can be moved in the axial direction.

11 Claims, 12 Drawing Sheets

(56) References Cited

U.S. PATENT DOCUMENTS

| | | | |
|---|---|---|---|
| 5,345,127 A * | 9/1994 | New | 310/90.5 |
| 5,577,707 A | 11/1996 | Brida | |
| 5,624,100 A | 4/1997 | Bolte et al. | |
| 5,643,194 A * | 7/1997 | Negre | 604/8 |
| 5,785,296 A | 7/1998 | Peube et al. | |
| 5,842,680 A * | 12/1998 | Bustamante et al. | 251/65 |
| 5,873,562 A | 2/1999 | Marugg | |
| 5,901,558 A | 5/1999 | Matte et al. | |
| 6,049,148 A * | 4/2000 | Nichols et al. | 310/68 B |
| 6,109,589 A * | 8/2000 | Ackermann | 251/65 |
| 6,299,129 B1 * | 10/2001 | Suzuki et al. | 251/129.11 |
| 6,902,145 B2 * | 6/2005 | Latzer et al. | 251/170 |
| 7,004,453 B1 * | 2/2006 | Cheng | 251/211 |
| 7,038,225 B2 * | 5/2006 | Kuo et al. | 250/492.22 |
| 7,177,008 B2 * | 2/2007 | Nishi et al. | 355/53 |
| 2001/0012483 A1 * | 8/2001 | Kono et al. | 414/744.5 |
| 2005/0285053 A1 | 12/2005 | Kuo et al. | |
| 2006/0138352 A1 * | 6/2006 | Tanaka | 250/492.3 |
| 2007/0228314 A1 * | 10/2007 | Geiser | 251/158 |

FOREIGN PATENT DOCUMENTS

| | | |
|---|---|---|
| DE | 4002777 A1 | 8/1991 |
| GB | 424387 A | 2/1935 |
| JP | 1963257449 A | 10/1988 |
| JP | H02-53247 U | 4/1990 |
| JP | 2010185932 A | 7/1998 |
| JP | 2003-283010 | 10/2003 |
| JP | 2004110969 A | 8/2004 |
| JP | 2007107398 A | 4/2007 |
| WO | 98/22956 A | 5/1998 |
| WO | 01/65157 A1 | 9/2001 |

* cited by examiner (a)

(b)

(a)

(b)

(c)

(a)

(b)

(a)

(b)

(a)  (b)

(a)  (b)

(a)

(b)

FIG.15
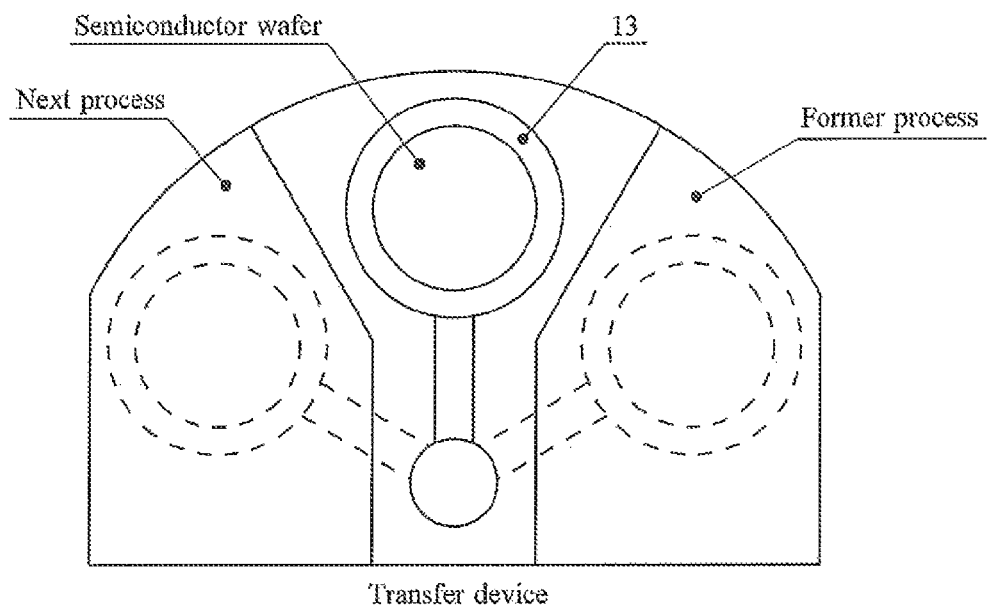
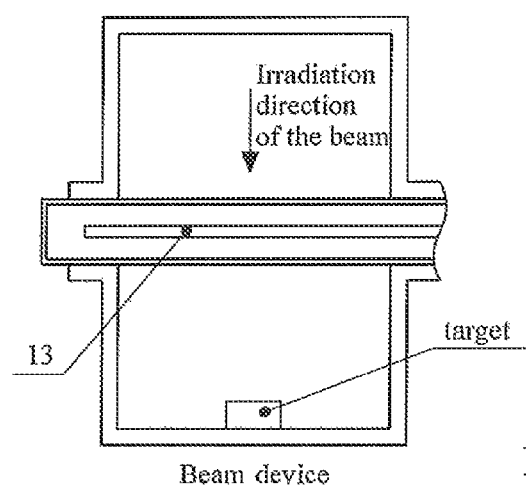
FIG.16

PLATE ROTATING DEVICE, EXHAUST PATH OPENING DEGREE CHANGING DEVICE, EXHAUSTED DEVICE, TRANSFER DEVICE, BEAM DEVICE, AND GATE VALVE

TECHNICAL FIELD

The present invention relates to a plate rotating device, an exhaust path opening degree changing device, an exhausted device, a transfer device, a beam device, and a gate valve, which use a technique for changing the position of a plate, for example, by means of the rotation of a rotating shaft.

BACKGROUND ART

In a semiconductor manufacturing apparatus, the exhausting of a vacuum vessel such as a process chamber is performed by using a vacuum pump such as a turbo molecular pump.

The suction port of the vacuum pump is connected to the exhaust port of the vacuum vessel via a gate valve that opens and closes the flow path of gas.

The gate valve has not only a function of opening/closing the flow path of gas but also a function of controlling the conductance of exhausted gas by adjusting the opening degree of the flow path of gas.

As the gate valve used in the vacuum device, a slide valve has been known which changes the opening area of the flow path of gas by sliding a valve plate as proposed in Patent Document 1.

Patent Document 1: Japanese Unexamined Patent

PATENT CITATION 1

Application Publication No. 1997 (H9)-178000

Patent Document 1 discloses a slide valve in which a handle provided with a slide plate at the tip end thereof is fixed to a shaft that is rotatingly driven by the action of a servomotor, by which the position of the slide plate with respect to the opening region, that is, the opening degree of the flow path of gas is adjusted by the rotation angle of the shaft.

SUMMARY OF INVENTION

Technical Problem

For the slide valve described in the aforementioned Patent Document 1, the driving mechanism and the opening/closing mechanism of the slide plate are composed very complexly. And the servomotor for driving the slide plate is disposed on the outside of a housing, that is, in the atmospheric region.

Therefore, since the shaft is present in both of the vacuum region and the atmospheric region, a vacuum seal mechanism must be provided in the boundary part.

As the vacuum seal mechanism, for example, vacuum grease, an O-ring, or a bellows is used.

However, when the vacuum grease is used, a vapor pressure may be generated from there, and when the O-ring is used, dust may be created by the friction with the shaft. Also, the vacuum seal mechanism using the vacuum grease or the O-ring has no sufficient reliability in maintaining high vacuum accuracy.

The bellows cannot anticipate a long service life in terms of durability in the case where the object is a moving body (movable body) such as the shaft although having a high vacuum seal function.

Accordingly, a first object of the present invention is to provide a mechanism which does opening and shutting processing by a simple structure.

Also, a second object thereof is to provide a gate valve having a mechanism in which a moving body can be stored in the housing.

Technical Solution

To achieve, the above-mentioned first object, the invention provides a plate rotating device characterized by including a rotator having magnetic poles; a rotation supporting means for supporting the rotator rotatably; an electromagnet making magnetic force act on the magnetic poles; a plate which is fixed on the rotator and is moved by the rotation of the rotator; and a control means for adjusting the rotation angle of the rotator by the excitation control of the electromagnet.

The invention provides the plate rotating device, characterized in that the plate driving device further includes a position detecting means for detecting the rotation angle of the rotator; and the excitation control controls the value of the current which flows in the winding of the electromagnet based on the rotation angle detected by the position detecting means.

The invention provides the plate rotating device, characterized in that the electromagnet is provided in plural numbers; and the excitation control selects at least one electromagnet from the plurality of electromagnets, and supplies the current to the windings of the selected electromagnet.

The invention provides the plate rotating device, characterized in that the electromagnet is provided in a pair so as to be opposed to each other via the rotator.

The invention provides the plate rotating device, characterized in that the arrangement position of the electromagnet can be adjusted.

The invention provides an exhaust path opening degree changing device provided in an exhaust path of an exhausted chamber, characterized in that the exhaust path opening degree changing device includes the plate rotating device; the plate is arranged as the movement path intersects with the exhaust path; and the control means controls the opening degree of the exhaust path by adjusting the rotation angle of the rotator.

The invention provides an exhausted device characterized by including a vacuum pump for exhausting gas from an exhausted chamber; the exhaust path opening degree changing device, which is provided in the exhaust path of the exhausted chamber, and a water vapor exhaust pump for exhausting water vapor in the exhausted chamber; and a control unit for centralizedly controlling the vacuum pump, the exhaust path opening degree changing device, and the water vapor exhaust pump.

The invention provides an exhausted device characterized by including an exhausted chamber; a vacuum pump for exhausting gas from the exhausted chamber; the exhaust path opening degree changing device, which is arranged in the exhaust path of the exhausted chamber; and a pressure detecting means for detecting the pressure of gas in the exhausted chamber, wherein the control means adjusts the opening degree of the exhaust path in the exhaust path opening degree changing device based on the gas pressure detected by the pressure detecting means.

The invention provides a transfer device for transferring a member to be transferred, characterized in that the transfer device comprises the plate rotating device; the member to be transferred is placed on the plate; and the control means moves the plate to a transfer destination by adjusting the rotation angle of the rotator.

The invention provides a beam device having an irradiation means for aiming beams at a target, characterized in that the beam device comprises the plate rotating device;

the plate is arranged as the principal plane thereof intersects the irradiation path of the beams; and the control means changes the quantity of the beams intercepted by the plate by adjusting the rotation angle of the rotator, whereby the irradiation area of beams aimed at the target is controlled.

To achieve the above-mentioned second object, the invention provides a gate valve which is provided on the upstream side of the suction port of a vacuum pump to open and close the flow path of gas flowing into the vacuum pump, characterized by including a housing having an opening part forming the flow path of gas; a rotating shaft accommodated in the housing; a spring for supporting the rotating shaft in the housing; a slide plate which is fixed to the rotating shaft and determines the opening area of the flow path of gas by means of the rotation angle of the rotating shaft; and an actuator for rotatingly driving the rotating shaft.

The invention provides the gate valve, characterized in that the spring is a conical coil spring.

The invention provides the gate valve, characterized in that the rotating shaft is supported by the spring and a magnetic bearing.

The invention provides the gate valve, characterized in that the actuator is formed by a solenoid actuator utilizing the power obtained by an electromagnet.

Advantageous Effects

According to the invention described in claim 1, the magnetic poles are provided on the rotating shaft, and the rotation angle of the rotating shaft, that is, the position of the plate can be controlled by attracting the magnetic poles by the electromagnet.

Also, according to the invention described in claim 11, the moving body that is driven when the valve is opened or closed can be supported easily in the housing by the use of the spring.

BRIEF DESCRIPTION OF DRAWINGS

FIG. 15 illustrates a transfer device; and

FIG. 16 illustrates a beam device.

Figure 1:
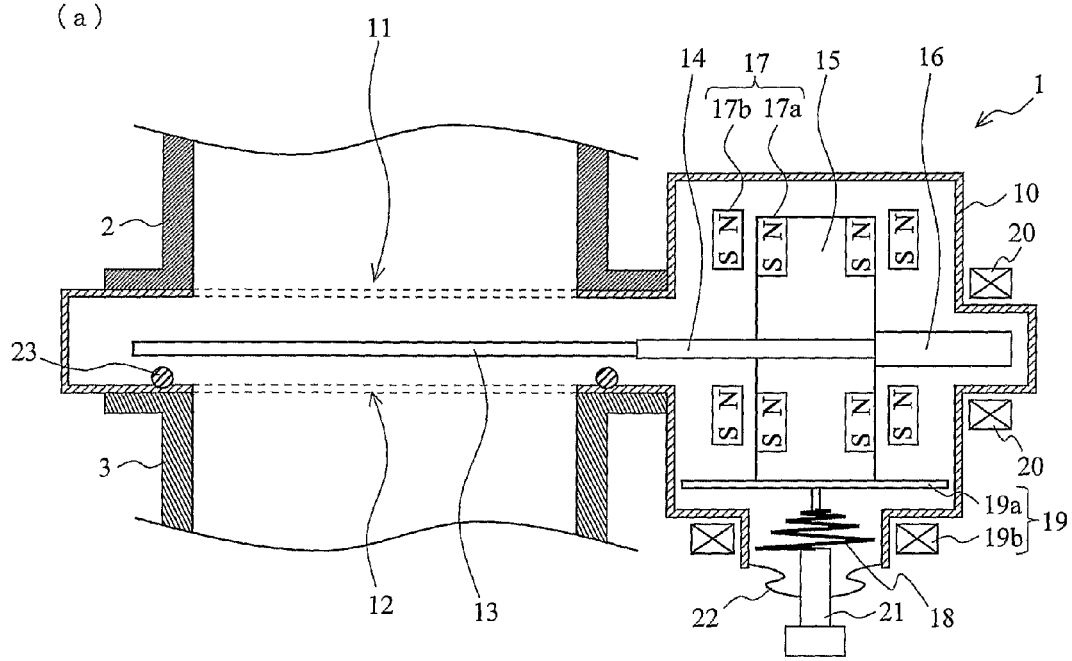
FIG. 1(a) is a view showing a general configuration of a slide type gate valve in accordance with a first embodiment.
FIG. 1(b) is a view showing the state of the gate valve in a state in which the flow path of gas is closed.
Figure 1:
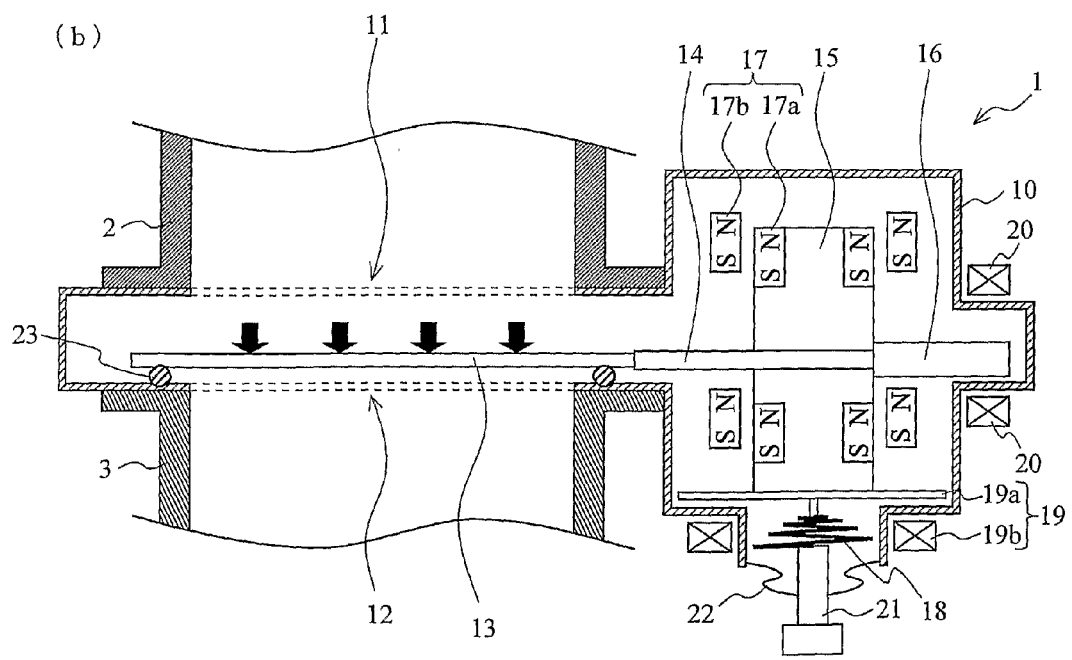

EXPLANATION OF REFERENCE 1 gate valve
2 vacuum vessel
3 vacuum pump
4 pressure sensor
5 controller
6 water pump
7 control unit
10 housing
11 inflow hole
12 outflow hole
13 slide plate
14 arm
15 shaft
16 balance weight
17 magnetic bearing
17a movable permanent magnet
17b fixed permanent magnet
18 shaft supporting spring
19 axial driving mechanism
19a electromagnet target
19b electromagnet
20, 60, 61 electromagnet
21 axial positioning mechanism
22 bellows
23 O-ring
41 pivot shaft
42 receiving element
50 permanent magnet
70 position sensor
71 sensor target
101 105 coil
120 electromagnet
130 power spring

DETAILED DESCRIPTION OF THE INVENTION

Preferred embodiments of the present invention will now be described in detail with reference to FIGS. 1 to 14.

First Embodiment

FIG. 1(a) is a view showing a general configuration of a slide type gate valve 1 in accordance with a first embodiment.

As shown in FIG. 1(a), the gate valve 1 is an opening/closing valve that is disposed between the exhaust port of a vacuum vessel 2 and a vacuum pump 3 to open and close the flow path of a gas flowing from the vacuum vessel 2 to the vacuum pump 3.

The vacuum vessel 2 is formed, for example, by a process chamber used in a semiconductor manufacturing apparatus, and the vacuum pump 3 is formed, for example, by a turbo molecular pump that evacuates the vacuum vessel 2.

Also, the gate valve 1 is configured so that the conductance of gas can be adjusted by changing the opening area of the flow path of gas. That is to say, the gate valve 1 has not only a function as an opening/closing valve but also a function as a conductance valve.

The gate valve 1 is provided with a housing 10 formed of a nonmagnetic metal such as aluminum.

The housing 10 is formed with a circular inflow hole 11 and outflow hole 12 for the gas at positions opposed to each other. The inflow hole 11 is provided on the upstream side of the flow path of gas, and the exhaust port of the vacuum vessel 2 is fixed so as to communicate with the inflow hole 11. Also, the outflow hole 12 is provided on the downstream side of the flow path of gas, and the suction port of the vacuum pump 3 is fixed so as to communicate with the outflow hole 12.

The gate valve 1 has a slide plate (shutter) 13 and a moving mechanism (shutter driving mechanism) for changing the radial and axial positions of the slide plate 13.

The slide plate 13 is a metallic disc functioning as a valve element for opening and closing the opening part of the outflow hole 12, and is accommodated in the housing 10 so as to be in parallel with the opening surfaces of the inflow hole 11 and the outflow hole 12.

The gate valve 1 has an arm 14, a shaft 15, a balance weight 16, a magnetic bearing 17, a shaft supporting spring 18, an axial driving mechanism 19, and an electromagnet 20 as the moving mechanism for the slide plate 13.

The arm 14 is a rectangular plate-shaped member. One end of the arm 14 is fixed to the shaft 15, and the slide plate 13 is attached (fixed) to the other end thereof.

Also, the slide plate 13 and the arm 14 may be formed as an integral member (formed integrally).

The shaft 15 is a rotating shaft (movable body), the axial displacement of which is controlled by the axial driving mechanism 19, and the rotation angle of which is controlled by a radial driving mechanism (the electromagnet 20 and the balance weight 16).

The shaft 15 is rotatably supported in the housing 10 by the magnetic bearing 17 and the shaft supporting spring 18.

The shaft 15 functions as a support shaft.

The magnetic bearing 17 is a repulsive type passive magnetic bearing device that is formed by a plurality of movable permanent magnets 17a provided on the shaft 15 and a plurality of fixed permanent magnets 17b that are fixed to the housing 10 and are disposed around the shaft 15. The magnetic bearing 17 supports the shaft 15 by utilizing a repulsive force of the opposed movable permanent magnets 17a and fixed permanent magnets 17b.

The shaft supporting spring 18 is a spiral spring (a conical coil spring) formed into a conical shape by winding a band-shaped plate or a coil into a coiled shape (a spiral shape). The shaft supporting spring 18 is formed by a metallic member such as spring steel, piano wire, or phosphor bronze.

The center end of the shaft supporting spring 18 is fixed to the shaft 15, and the outer peripheral end thereof is fixed to the housing 10 side.

In the first embodiment, since an axial positioning mechanism 21 is provided to set the axial position of the shaft 15, the shaft supporting spring 18 is attached to the fixing side via the axial positioning mechanism 21.

The shaft supporting spring 18 functions as a spring for controlling the axial position.

The balance weight 16 is a weight for balancing against the weight of the slide plate 13, and is fixed on the extension of the arm 14 in the shaft 15 (at a position axis-symmetrical with the slide plate 13).

The balance weight 16 is formed by a member that is attracted by a magnet (for example, iron). When the rotation angle of the shaft 15 is controlled (the radial displacement is controlled), the balance weight 16 functions as the target part of the electromagnet 20 (electromagnet target) forming the radial driving mechanism.

The radial driving mechanism for the shaft 15 is formed by the electromagnet 20 provided in the up-and-down direction of the balance weight 16 (on the vacuum vessel 2 side and the vacuum pump 3 side) and the balance weight 16 functioning as the electromagnet target.

The radial driving mechanism for the shaft 15 functions as a solenoid actuator utilizing the power obtained by the electromagnet.

In the first embodiment, a pair of electromagnets 20 are disposed so as to be opposed to each other via the balance weight 16.

By controlling the attraction force of the electromagnets 20 on the balance weight 16, the shaft 15 can be moved (turned) in the radial direction.

The axial driving mechanism 19 is formed by a plate-shaped electromagnet target 19a provided in the lower end part of the shaft 15 (in the end part on the vacuum pump 3 side) and an electromagnet 19b disposed at a position opposed to the electromagnet target 19a.

By controlling the attraction force of the electromagnet 19b on the electromagnet target 19a, the shaft 15 can be moved in the axial direction.

The gate valve 1 is provided with the axial positioning mechanism 21 and a bellows 22.

The axial positioning mechanism 21 is a device fixed to the housing 10, and is a device for performing the initial setting of the axial reference position of the shaft 15. Therefore, the axial positioning mechanism 21 does not operate basically during the operation of the gate valve 1, and is in a state of being fixed to the housing 10.

A part of the axial positioning mechanism 21 is provided on the outside of the housing 10 so that the adjustment from the outside can be made easily. Therefore, the bellows 22 is provided as a vacuum seal mechanism in the boundary part between the vacuum region and the atmospheric region.

Since the axial positioning mechanism 21 is basically in a state of being fixed as described above, a long service life of the bellows 22 can be anticipated. That is to say, since the object to be sealed by the bellows 22 is a fixed body, high durability can be maintained for a long period of time.

In the case where the axial position accuracy of the shaft 15 can be maintained sufficiently by the shaft supporting spring 18 only, the shaft supporting spring 18 may be fixed directly in the housing 10 without the use of the axial positioning mechanism 21. In this case, since a member disposed in both of the vacuum region and the atmospheric region is absent, the vacuum accuracy can be kept by a simple seal structure.

In the first embodiment, all of the electromagnets (the electromagnets 19b, 20, etc.) having a possibility of producing a vapor pressure when being disposed in the vacuum region are disposed in the atmospheric region, that is, on the outside of the housing 10.

Also, the gate valve 1 is provided with an O-ring 23.

The O-ring 23 is an annular seal member mounted in a fitting groove formed continuously along the circumferential direction in the region on the outside of the outflow hole 12 on the inside surface of the housing 10.

The O-ring 23 has a function of sealing the outflow hole 12 by being collapsed by the slide plate 13 when the flow path of gas is closed.

That is to say, by moving the slide plate 13 in the axial direction of the shaft 15, a simple seal mechanism can be realized.

Although the O-ring 23 is provided on the inside of the housing of the gate valve 1 in this embodiment, the arrangement position of the O-ring 23 is not limited to this position. Even if, for example, the O-ring 23 is provided on the lower surface (on the surface on the vacuum pump 3 side) of the slide plate 13, the same sealing effect can be achieved.

FIG. 1(b) is a view showing the state of the gate valve 1 in a state in which the flow path of gas is closed.

In the case where the flow path of gas is closed (completely enclosed) by the gate valve 1, the slide plate 13 is moved to a position at which the outflow hole 12 is covered completely, and thereafter the axial driving mechanism 19 is operated. Specifically, the electromagnet target 19a is attracted by the electromagnet 19b, by which the shaft 15 is moved downward along the axis line.

Then, as shown in FIG. 1(b), the slide plate 13 moves in the vacuum pump 3 direction (the outflow hole 12 direction), and comes into close contact with the O-ring 23.

Thus, the flow path of gas (the outflow hole 12) is closed by the slide plate 13.

The opening/closing method of the flow path of gas is not limited to the above-described method. For example, the slide plate 13 may be moved to the vacuum vessel 2 side to open and close the inflow hole 11. In this case, a driving mechanism for the slide plate 13, which is similar to the axial driving mechanism 19, is provided on the vacuum vessel 2 side. The O-ring 23 for sealing is also provided on the vacuum vessel 2 side of the housing 10, or on the upper surface (on the surface on the vacuum vessel 2 side) of the slide plate 13.

Also, the opening part that is opened and closed by the slide plate 13 may be configured so that either of the inflow hole 11 and the outflow hole 12 can be selected arbitrarily. In this case, the opening/closing mechanism and the seal mechanism for both of the inflow hole 11 and the outflow hole 12 are provided in advance.

Next, the positional relationship between the slide plate 13 and the outflow hole 12 is explained.

FIG. 2(a) is a view showing a fully-opened state of the flow path of gas.

In the case where the flow path of gas is made in a fully-opened state as shown in FIG. 2(a), the slide plate 13 is moved to a position at which the slide plate 13 does not overlap with the outflow hole 12.

FIG. 2(b) is a view showing a half-opened state of the flow path of gas.

As shown in FIG. 2(b), by adjusting the opening area (opening degree) of the outflow hole 12 at a position at which the slide plate 13 overlaps with the outflow hole 12, the conductance of gas can be controlled.

The control of the intermediate position of the slide plate 13 between the fully-closed position and the fully-opened position of the outflow hole 12 is carried out by feeding back the opening position matching a pressure required in the vacuum vessel 2. That is to say, the vacuum system has an APC (Automatic Pressure Control) function.

FIG. 2(c) is a view showing a fully-closed state of the flow path of gas.

In the case where the flow path of gas is made in a fully-closed state as shown in FIG. 2(c), the slide plate 13 is moved to a position at which the slide plate 13 overlaps completely with the outflow hole 12.

In the case where the flow path of gas is made in a fully-closed state as shown in FIG. 2(c), after the slide plate 13 has been moved, as shown in FIG. 1(b), the slide plate 13 is further moved in the vacuum pump 3 (the outflow hole 12) direction to seal the flow path of gas by means of the O-ring 23.

Figure 2:
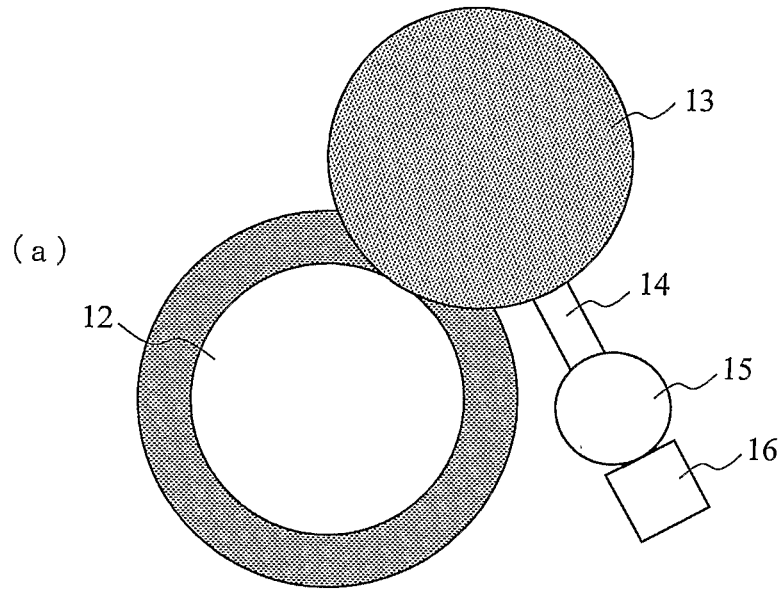
FIG. 2(a) is a view showing a fully-opened state of the flow path of gas.
FIG. 2(b) is a view showing a half-opened state of the flow path of gas.
FIG. 2(c) is a view showing a fully-closed state of the flow path of gas.
Figure 2:
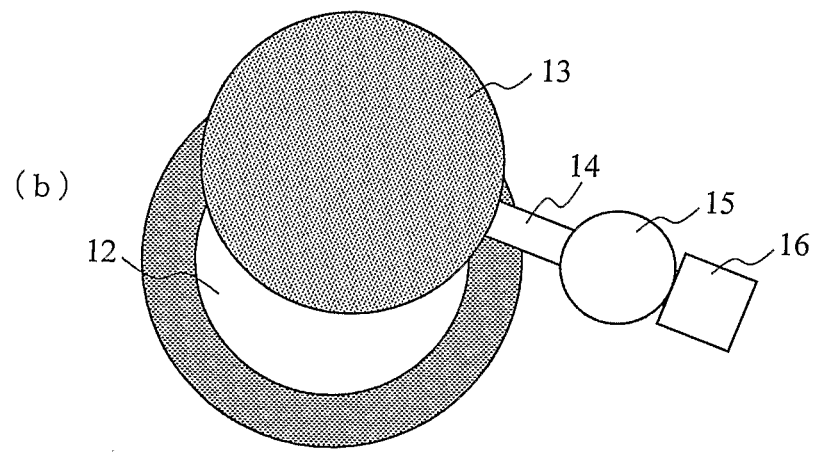
Figure 2:
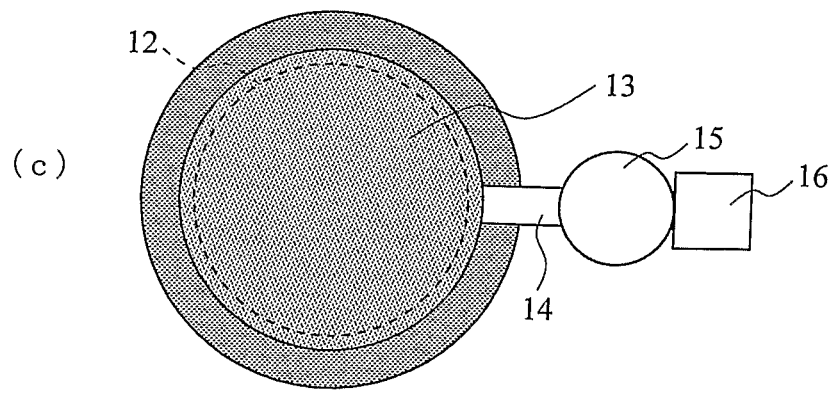
Figure 3:
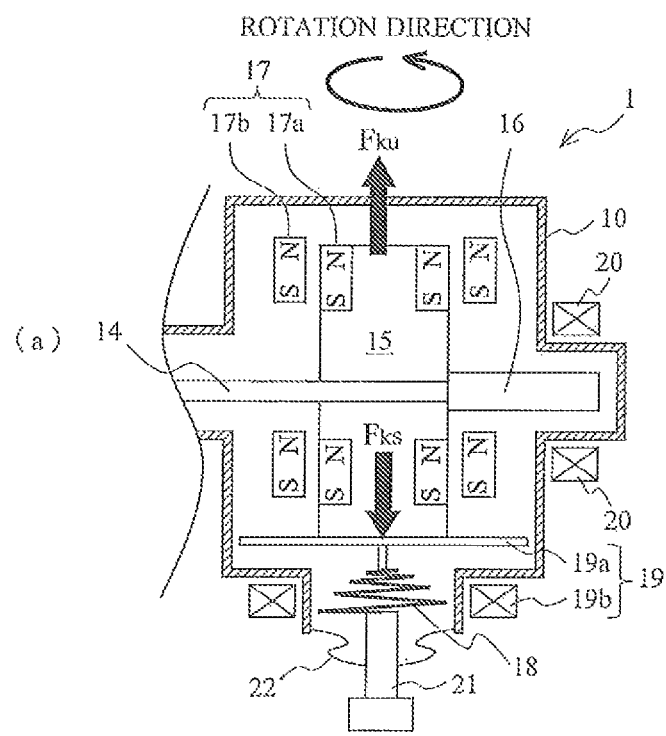
FIG. 3(a) is a view showing the state of a force acting on a shaft.
FIG. 3(b) is a graph showing the relationship between the force acting on the shaft and the axial displacement of the shaft.
Figure 3:
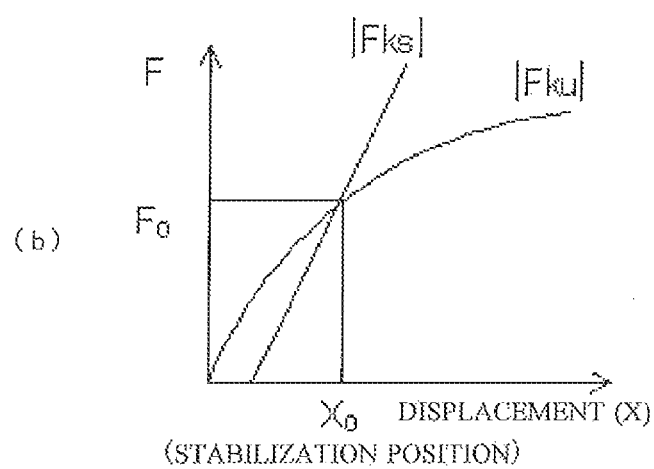
Figure 4:
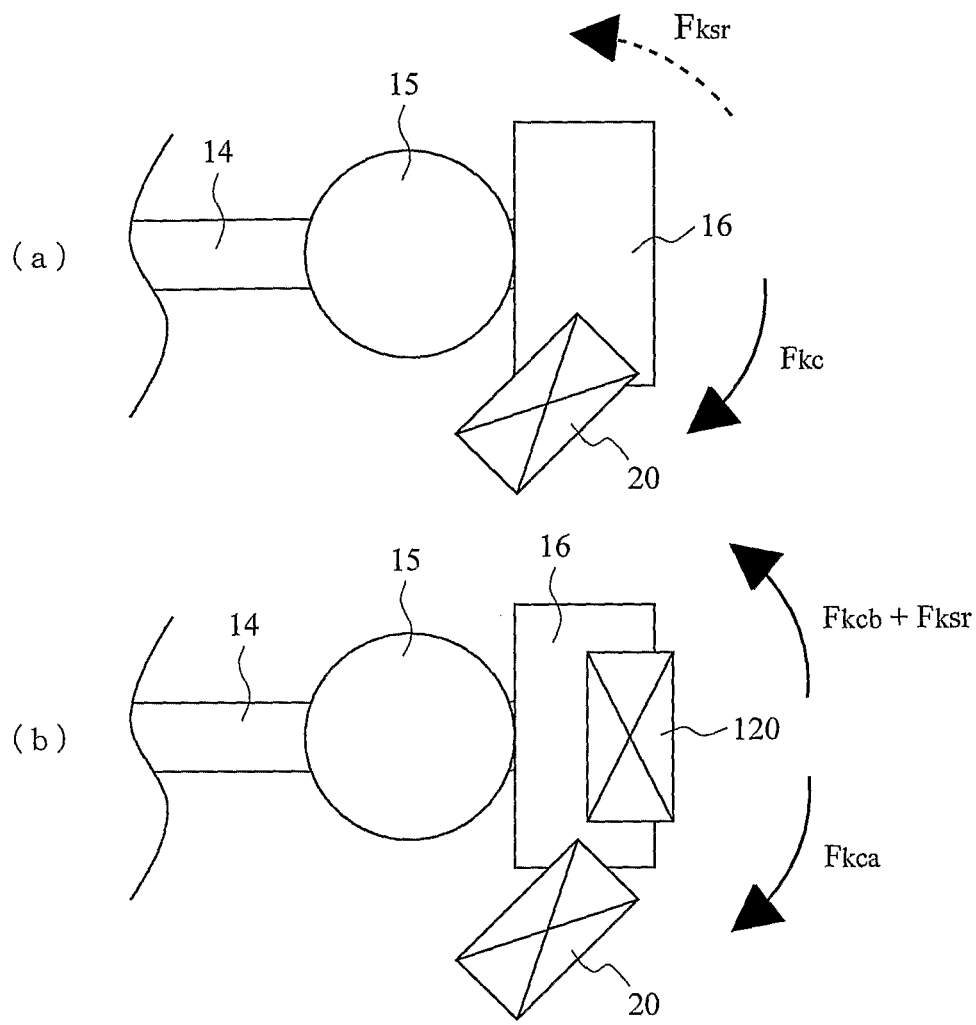
FIG. 4(a) is a view for explaining a method for setting the radial position of a shaft.
FIG. 4(b) is a view showing a modification of the method for setting the radial position of the shaft.

As shown in FIG. 2, the gate valve 1 is configured so that the opening degree of the flow path of gas is adjusted by controlling the radial position of the slide plate 13.

The position control of the slide plate 13 is carried out by controlling the rotation angle of the shaft 15. The method for controlling the rotation angle of the shaft 15 is described later.

Next, the axial position of the shaft 15 supported by the magnetic bearing 17 and the shaft supporting spring 18 is explained.

Herein, the axial position of the shaft 15 at the time when the flow path of gas is fully opened or half opened, or during the time when the slide plate 13 is operated to open or close the flow path of gas (during the time when the slide plate 13 is moving), not in the state in which the axial driving mechanism 19 is driven to press the slide plate 13 against the outflow hole 12 as shown in FIG. 1(b), is explained.

FIG. 3(a) is a view showing the state of a force acting on a shaft 15.

As shown in FIG. 3(a), on the shaft 15 supported by the magnetic bearing 17 and the shaft supporting spring 18, a repulsive force $F_{ku}$ of the S pole of the movable permanent magnet 17a and the S pole of the fixed permanent magnet 17b of the magnetic bearing 17 acts in the direction in which the shaft supporting spring 18 is disposed.

Also, on the shaft 15, a restoring force $F_{ks}$ of the shaft supporting spring 18 acts in the direction in which the shaft 15 is disposed.

FIG. 3(b) is a graph showing the relationship between the force acting on the shaft 15 and the axial displacement of the shaft 15.

As shown in FIG. 3(b), the shaft 15 is set at the displacement position in the state in which the repulsive force $F_{ku}$ of the magnetic bearing 17 and the restoring force $F_{ks}$ of the shaft supporting spring 18 are equal to each other (balanced), that is, at the stabilization position in the axial direction of the shaft 15.

In the first embodiment, the magnetic force of the magnetic bearing 17 and the spring constant of the shaft supporting spring 18 are set so that the stabilization position in the axial direction of the shaft 15 is set at a position at which the slide plate 13 is disposed near the intermediate position between the inflow hole 11 and the outflow hole 12.

That is to say, at the stabilization position, the electromagnet 19b is not energized (the axial driving mechanism 19 is not operated).

In the case where it is difficult to keep the variations in stabilization position in an allowable range, the axial position of the shaft 15 may be set by utilizing the axial positioning mechanism 21.

Successively, a method for controlling the rotation angle of the shaft 15 to set the position of the slide plate 13, that is, a method for setting the radial position of the shaft 15 is explained.

In the first embodiment, at the reference angle (rotation angle=0°) in the state in which no force acts in the radial direction on the shaft 15 (the radial driving mechanism does not operate), that is, in the natural length state in which a load force (load) in the winding direction does not act on the shaft supporting spring 18, the slide plate 13 is set so as to be disposed at a position at which the flow path of gas is fully closed as shown in FIG. 2(c).

That is to say, in the first embodiment, the configuration is made so that by driving the radial driving mechanism, the opening degree of the flow path of gas is set.

FIG. 4(a) is a view for explaining a method for setting the radial position of the shaft 15.

FIG. 4(a) is a plan view in which the shaft 15 is viewed from above the gate valve 1 shown in FIG. 1(a), that is, from the vacuum vessel 2 side.

For example, in the gate valve 1, in the case where the slide plate 13 is moved from the fully-closed position to the half-opened position or the fully-opened position, the radial driving mechanism is driven to rotate the shaft 15.

Specifically, a current is supplied to the electromagnets 20, and a force that attracts the balance weight 16 functioning as the target part of the electromagnets 20 (electromagnet target), that is, a tensile force $F_{kc}$ of the electromagnets 20 is applied in the electromagnet 20 direction, by which the shaft 15 is rotated in the electromagnet 20 direction.

Then, onto the shaft 15, a restoring force $F_{ksr}$ that tends to return the coil wound up by the rotation of the shaft 15 to its original position is applied in the direction opposite to the tensile force $F_{kc}$ of the electromagnets 20 by the shaft supporting spring 18 supporting the shaft 15.

When the radial driving mechanism is driven in this manner, on the shaft 15, the tensile force $F_{kc}$ and the restoring force $F_{ksr}$ act in the direction opposite to each other.

The rotation angle of the shaft 15 (the rotation angle of the arm 14), that is, the radial movement position of the slide plate 13 is determined (set) by the balance (resultant force) of the tensile force $F_{kc}$ and the restoring force $F_{ksr}$.

In the first embodiment, the disposition position of the electromagnets 20 is set so that the slide plate 13 is at the fully-opened position of the flow path of gas shown in FIG. 2(a) at a position at which the center of the balance weight 16 and the center of the electromagnet 20 are lapped on each other (aligned in the axis line direction).

That is to say, the configuration is made so that when the tensile force $F_{kc}$ of the electromagnets 20 of a degree such that the restoring force $F_{kr}$ of the shaft supporting spring 18 is negligible acts, the slide plate 13 is disposed at the fully-opened position.

Also, in the first embodiment, when the driving of the radial driving mechanism, that is, the supply of current to the electromagnets 20 is stopped, by the action of the restoring force $F_{ksr}$, the slide plate 13 can be returned automatically from the half-opened position or the fully-opened position to the fully-closed position.

Actually, considering the stability (instability) of the radial driving mechanism, design (for example, the setting of the spring constant of the shaft supporting spring 18) is made.

Thus, according to the first embodiment, by utilizing the restoring force $F_{ksr}$ of the shaft supporting spring 18, the slide plate 13 can be returned easily to the reference position (fully-closed position).

In the method for setting the radial position of the shaft 15 as described above, the setting method in the case where the paired electromagnets 20 are used as shown in FIG. 4(a) has been explained. However, the method for setting the radial position of the shaft 15 is not limited to this method.

FIG. 4(b) is a view showing a modification of the method for setting the radial position of the shaft 15.

For example, as shown in FIG. 4(b), another pair of electromagnets 120 may be provided so that the radial position of the shaft 15 is set by using the electromagnets 20 and the electromagnets 120.

Specifically, the electromagnets 120 are disposed so that the slide plate 13 is at the fully-closed position of the flow path of gas shown in FIG. 2(c) at a position at which the center of the balance weight 16 and the center of the electromagnet 120 are lapped on each other (aligned in the axis line direction).

The electromagnets 120 are disposed so as to be opposed to each other via the balance weight 16 as in the case of the electromagnets 20.

In the case where the gate valve 1 is made in a fully-opened state, a current such that a tensile force $F_{kca}$ of the electromagnets 20 of a degree such that the restoring force $F_{ksr}$ of the shaft supporting spring 18 is negligible acts is supplied to the electromagnets 20.

On the other hand, in the case where the gate valve 1 is made in a fully-closed state, the supply of current to the electromagnets 20 is stopped, and the supply of current to the electromagnets 120 is started. Then, the balance weight 16 is attracted to the electromagnets 120, that is, a tensile force $F_{kcb}$ of the electromagnets 120 is applied, by which the shaft 15 (the arm 14) is returned rapidly to the reference angle (rotation angle=00).

By providing the electromagnets 120 in this manner, the shaft 15 can be returned to the proper reference angle (reference position) in a shorter period of time even if an error (positional shift error, deformation error, etc.) is produced on the shaft supporting spring 18 by secular deterioration, poor manufacturing accuracy, and the like.

Also, in the case where the conductance of gas is adjusted (controlled) by moving the slide plate 13 to a position at which the flow path of gas is half opened as shown in FIG. 2(b), a current for adjustment is supplied to both of the electromagnets 20 and the electromagnets 120.

Then, the slide plate 13 moves to a position corresponding to the value of the current for adjustment, that is, a position determined (set) by the balance (resultant force) of the tensile force $F_{kca}$ of the electromagnets 20, the tensile force $F_{kcb}$ of the electromagnets 120, and the restoring force $F_{ksr}$ of the shaft supporting spring 18.

By making the outputs of the electromagnets 20 and the electromagnets 120 a sufficiently large value to a degree such that the restoring force $F_{ksr}$ of the shaft supporting spring 18 is negligible, the rotation angle of the shaft 15 can be set easily merely by considering the balance of the current for adjustment.

By providing the electromagnets 120 in this manner, highly accurate control of conductance (control of the position of the slide plate 13) can be carried out.

Figure 5:
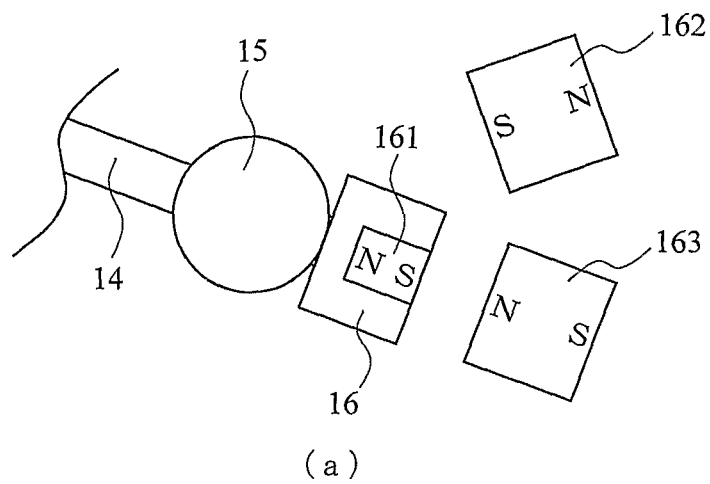
FIG. 5 is a view showing another modification of a method for setting the radial position of a shaft.
Figure 5:
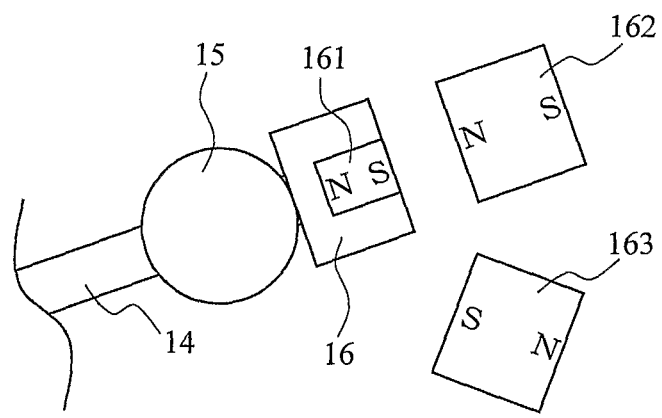

FIG. 5 is a view showing another modification of the method for setting the radial position of the shaft 15.

Also, in the case where only a simple opening/closing operation of the flow path of gas is performed in the gate valve 1, as shown in FIG. 5, for example, a permanent magnet 161 is provided at the outside end of the balance weight 16 (or the balance weight 16 is formed by a permanent magnet), and further permanent magnets 162 and 163 are disposed on the outside of the balance weight 16.

The permanent magnet 162 is disposed on the extension of the rotation angle of the balance weight 16 in the closed state of the gate valve 1, and the permanent magnet 163 is disposed on the extension of the rotation angle of the balance weight 16 in the opened state thereof.

The permanent magnet 161 is disposed in the direction in which the magnetic poles (the S pole/the N pole) are connected (adjacently connected) along the radial direction.

The permanent magnets 162 and 163 are also disposed in the direction in which the magnetic poles (the S pole/the N pole) are connected (adjacently connected) along the radial direction. The permanent magnets 162 and 163 each are a movable body in which the orientation of the magnetic poles can be reversed 180 degrees, and are configured so that the orientation of the magnet poles is changed when the flow path of gas is opened or closed.

In the case where the gate valve 1 is made in an opened state, as shown in FIG. 5(a), the permanent magnet 163 is set in the direction such as to attract the permanent magnet 161 of the balance weight 16, and on the other hand, the permanent magnet 162 is set in the direction such as to repel the permanent magnet 161 of the balance weight 16.

Thereby, the slide plate 13 is moved rapidly to a fully-closed position by attracting the permanent magnet 161 of the balance weight 16 to the permanent magnet 163.

Also, in the case where the gate valve 1 is made in a closed state, as shown in FIG. 5(b), the permanent magnet 162 is set in the direction such as to attract the permanent magnet 161 of the balance weight 16, and on the other hand, the permanent magnet 163 is set in the direction such as to repel the permanent magnet 161 of the balance weight 16.

Thereby, the slide plate 13 is moved rapidly to a fully-opened position by attracting the permanent magnet 161 of the balance weight 16 to the permanent magnet 162.

Also, even if the current is reversed as the electromagnet instead of reversing the permanent magnets 162 and 163, the same operation can be performed.

Figure 6:
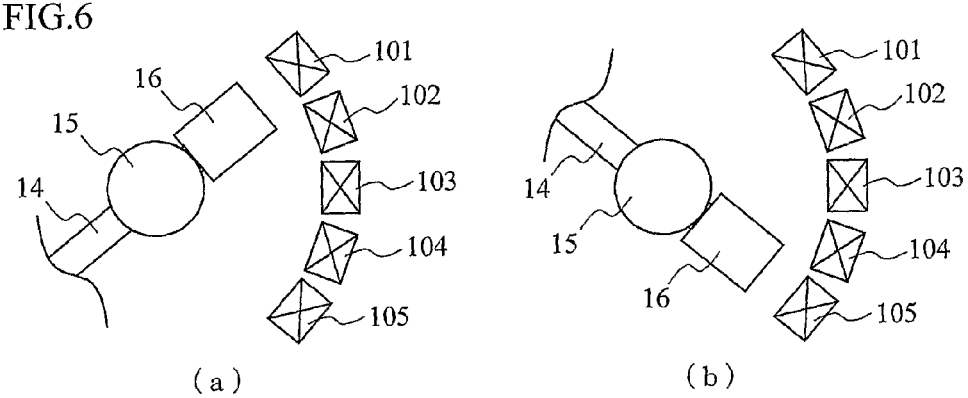
FIG. 6 is a view showing still another modification of a method for setting the radial position of a shaft.

FIG. 6 is a view showing still another modification of the method for setting the radial position of the shaft 15.

To further increase the accuracy of position control of the slide plate 13, a plurality of windings (coils 101 to 105) may be disposed so that the rotation angle of the shaft 15 is controlled by changing a winding in which a current is caused to flow.

For example, in the case where the rotation angle of the shaft 15 is set at the position shown in FIG. 6(a), a current is supplied to the coil 101 to attract the balance weight 16. In the case where the rotation angle of the shaft 15 is set at the position shown in FIG. 6(b), a current is supplied to the coil 105 to attract the balance weight 16.

Also, for example, in the case where the balance weight 16 is moved to an intermediate position between the coil 101 and the coil 102, a current is supplied to both of the coil 101 and the coil 102 so that the attraction force is controlled so as to be in balance at the intermediate position between the coil 101 and the coil 102.

In the modification shown in FIG. 6, the case where the five windings (coils 101 to 105) are used has been explained. However, the number of windings arranged can be changed according to the required position accuracy of the slide plate 13.

In the above-described embodiment, the shaft 15 is rotatably supported in the housing 10 by the magnetic bearing 17 and the shaft supporting spring 18. However, the method for supporting the shaft 15 is not limited to this method.

Figure 7:
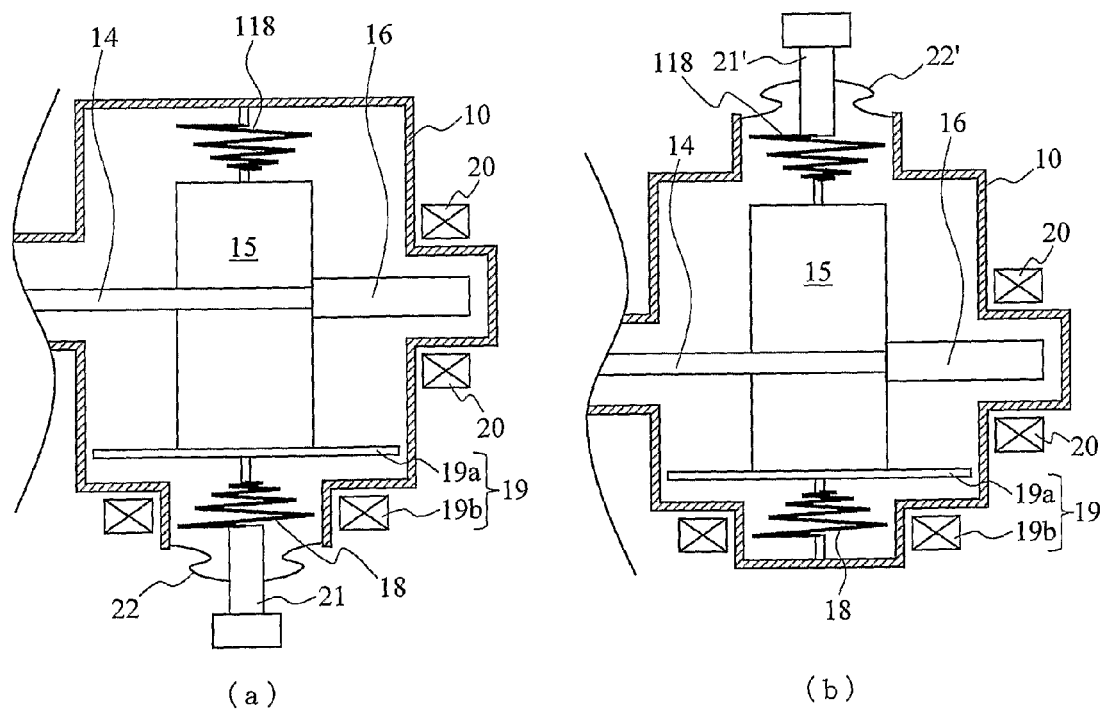
FIG. 7 is a view showing a modification of a method for supporting a shaft.

FIG. 7 is a view showing a modification of the method for supporting the shaft 15.

For example, as shown in FIG. 7(a), the shaft 15 may be rotatably supported in the housing 10 by the shaft supporting spring 18 and a shaft supporting spring 118 provided both ends of the shaft 15.

The shaft supporting spring 118 is formed like the shaft supporting spring 18. The center end of the shaft supporting spring 118 is fixed to the shaft 15, and the outer peripheral end thereof is fixed to the housing 10.

In the case where the shaft 15 is supported in this manner, a radial load also must be supported by the shaft supporting springs 18 and 118. Therefore, the shaft supporting springs 18 and 118 are configured so as to have rigidity of a degree such as to be capable of supporting the radial load.

The gate valve 1 of the modification shown in FIGS. 7(a) and 7(b) is configured so that the shaft supporting springs 18 and 118 are provided at both ends of the shaft 15, and both of the radial centripetal function and the vertical centripetal function of the shaft supporting springs 18 and 118 are utilized positively.

By supporting the shaft 15 in the housing 10 by the shaft supporting springs 18 and 118, the support mechanism for the shaft 15 can be simplified.

In the case where the position accuracy in the axial direction of the shaft 15 can be maintained sufficiently by the shaft supporting springs 18 and 118 only, the shaft supporting spring 18 may be fixed in the housing 10 without the use of the axial positioning mechanism 21.

Also, in the modification shown in FIG. 7(a), the axial positioning mechanism 21 and the outer peripheral end of the shaft supporting spring 18 are fixed to each other. However, the disposition position of the axial positioning mechanism 21 is not limited to this position.

The axial positioning mechanism 21 may be disposed on the shaft supporting spring 118 side, for example, as shown in FIG. 7(b)

Figure 8:
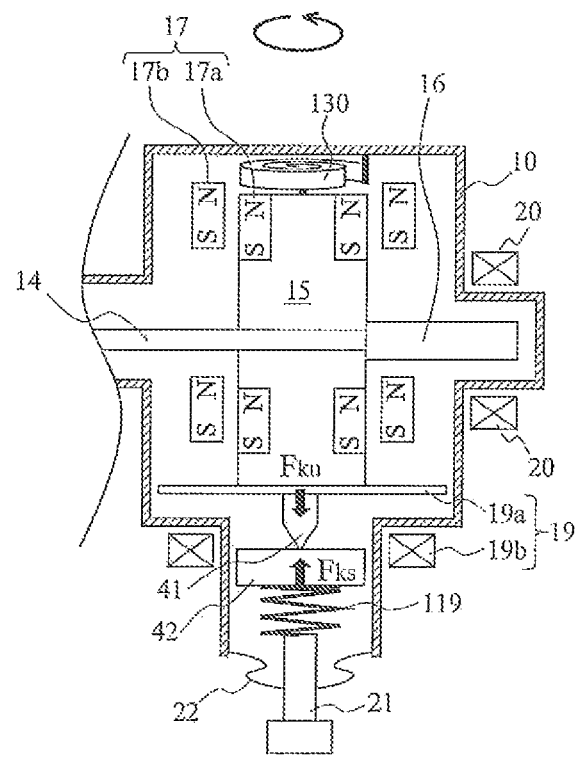
FIG. 8 is a view showing another modification of a method for supporting a shaft.

FIG. 8 is a view showing another modification of the method for supporting the shaft 15.

For example, a pivot bearing may be used to support the shaft 15 in the axial direction, or a flat power spring 130 may be used to restore the rotation direction of the shaft 15.

Specifically, as shown in FIG. 8, a pivot shaft 41 is provided in the end part of the shaft 15, and also a receiving element 42 is provided in the end part of a shaft supporting spring 119.

The pivot bearing is a bearing formed by the pivot shaft 41 having a roundness at the tip end and the receiving element 42 having a spherical depression.

Herein, as shown in FIG. 8, the shaft supporting spring 119 is arranged between the axial positioning mechanism 21 and the receiving element 42 of the pivot bearing. That is to say, the shaft supporting spring 119 is configured so as to support the shaft 15 via the pivot bearing.

The power spring 130 is arranged above the shaft 15, and is configured so as to generate the restoring force $F_{ksr}$ when the shaft 15 is rotated.

In the modification shown in FIG. 8, the shaft 15 is supported by using the shaft supporting spring 119 consisting of a simple coil spring that causes only the restoring force $F_{ks}$ in the axial direction of the shaft 15 to act, not a conical coil spring.

The configuration in which the power spring 130 for causing the restoring force $F_{ksr}$ in the rotation direction to act is provided separately as shown in this modification is effective when the restoring force $F_{ksr}$ in the rotation direction is set regardless of the restoring force $F_{ks}$ in the axial direction.

Herein, as shown in FIG. 8, the magnetic bearing 17 is arranged so that the repulsive force $F_{ku}$ of the magnetic bearing 17 acts in the disposition direction of the shaft supporting spring 119.

Also, the shaft supporting spring 119 is provided so that the restoring force $F_{ks}$ in the axial direction of the shaft supporting spring 119 acts in the shaft 15 direction. That is to say, herein, the configuration is made so that the receiving element 42 (pivot bearing) is supported by utilizing the compressive force of the shaft supporting spring 119.

By using the pivot bearing capable of point contact in this manner, the shaft 15 can be rotatably supported with ease.

Also, in the first embodiment, the configuration is made so that the opening area of the flow path of gas is adjusted by sliding the slide plate 13 in the direction perpendicular to the axis line of the shaft 15, that is, in the horizontal direction when the axis line of the shaft 15 is in the vertical direction with respect to the outflow hole 12. However, the method for adjusting the opening area of the flow path of gas is not limited to this method.

Figure 9:
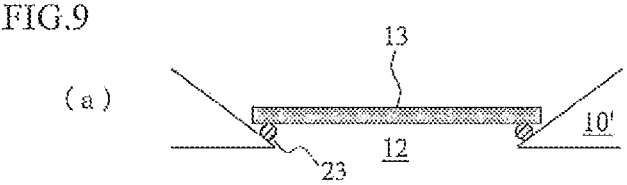
FIG. 9 is a view showing a modification of a method for adjusting the opening area of the flow path of gas.
Figure 9:
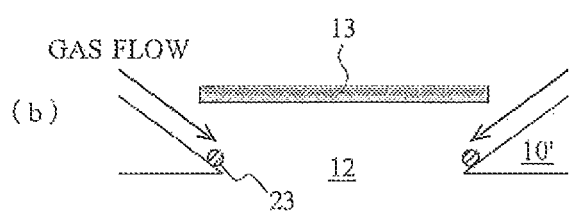

FIG. 9 is a view showing a modification of the method for adjusting the opening area of the flow path of gas.

For example, as shown in FIG. 9, the opening area (opening degree) of the flow path of gas may be adjusted by moving the slide plate 13 in parallel along the axial direction of the shaft 15.

Specifically, as shown in FIG. 9(a), the slide plate 13 is moved in the outflow hole 12 direction and is pressed against the O-ring 23, by which the flow path of gas is closed.

Also, as shown in FIG. 9(b), the slide plate 13 is moved in the direction opposite to the outflow hole 12, by which the flow path of gas is opened.

Also, in the first embodiment, the configuration is made so that the opening degree of the flow path of gas can be adjusted finely by forming the outer peripheral wall part of the outflow hole 12 in a housing 10' so as to have a wedge-shaped cross section such that the thickness decreases toward the outflow hole 12 as shown in FIG. 9.

In the case where the flow path of gas is opened and closed by moving the slide plate 13 in the axis line direction of the shaft 15, the axial driving mechanism 19 is used, and the radial driving mechanism is not provided.

In the case where such an opening/closing structure is used, the accuracy of controlling the opening degree of the flow path of gas can be improved by widening the movable range in the axial direction of the shaft 15.

According to the first embodiment, by configuring the gate valve 1 so that the O-ring or the bellows is not used for transmitting the driving force of the slide plate 13, the vacuum seal mechanism for introducing the driving member as in the conventional example can be excluded. Thereby, the decrease in durability and the shortening of product life caused by a mechanically wearing or contacting part (member) can be restrained properly.

Also, in the first embodiment, a trouble caused by a vapor pressure generating from grease can be eliminated by no use of a structure requiring the application of grease.

According to the first embodiment, since the gate valve 1 can be configured by a simple mechanism (for example, a simple actuator or a simple seal mechanism), the manufacturing cost can be reduced.

Second Embodiment

In the above-described first embodiment and the modifications thereof, the radial driving mechanism in which the balance weight 16 and the magnets disposed on the balance weight 16 function as the target part for attracting operation has been explained. However, the method for arranging the target part in the radial driving mechanism for the valve is not limited to this method.

Accordingly, in a second embodiment, a slide type gate valve 1' in which the target part for attracting operation in the radial driving mechanism is provided in an intermediate portion in the axis line direction of the shaft 15 is explained.

Figure 10:
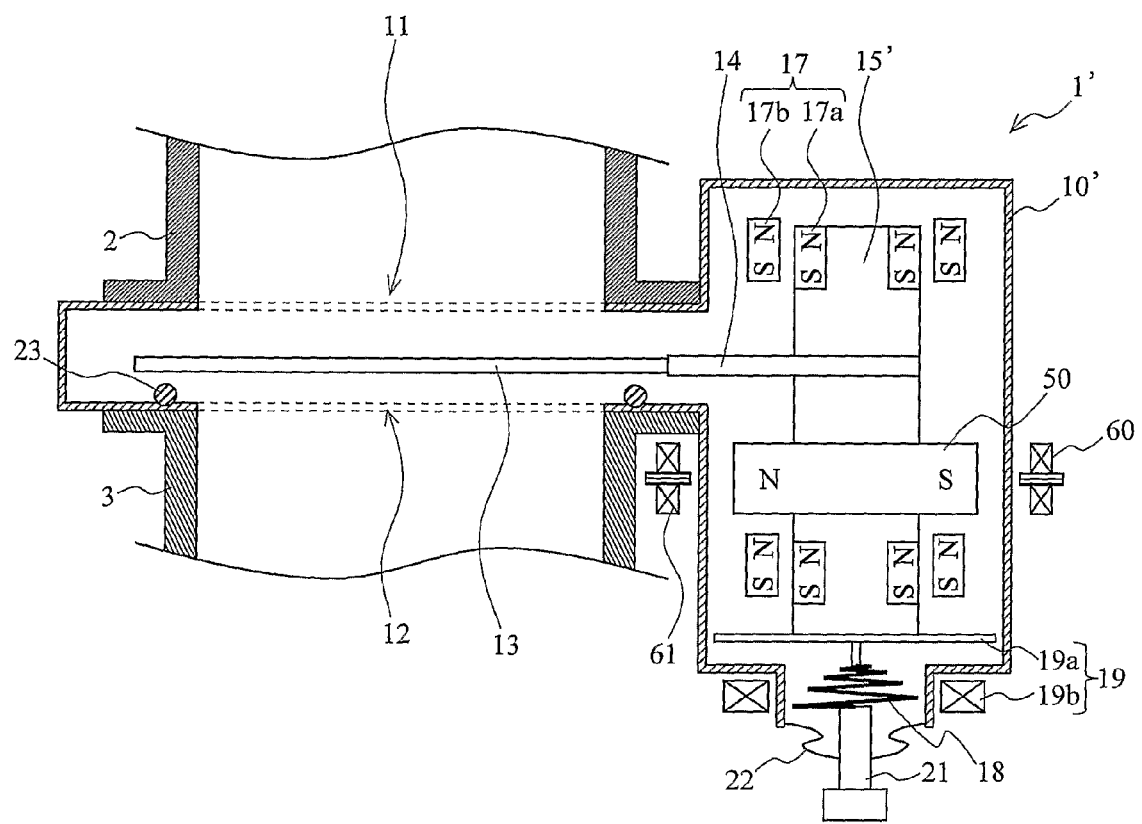
FIG. 10 is a view showing a general configuration of a slide type gate valve in accordance with a second embodiment.

FIG. 10 is a view showing a general configuration of the slide type gate valve 1 in accordance with the second embodiment.

In the second embodiment, the same reference numerals are applied to elements that are the same as those in the above-described first embodiment and the modifications thereof (for example, the slide plate 13, the arm 14, the magnetic bearing 17, the axial driving mechanism 19, the axial positioning mechanism 21, the vacuum seal mechanism), and the detailed explanation thereof is omitted.

However, in the gate valve 1' in the second embodiment, since the balance weight 16 is not used, the configuration is made so that the magnetic bearing 17 is provided with a strength of a degree such that the balance of a shaft 15' can be kept sufficiently.

As shown in FIG. 10, the radial driving mechanism for the shaft 15' in the gate valve 1' is formed by a permanent magnet 50 functioning as an electromagnet target, an electromagnet 60 provided on the S pole side of the permanent magnet 50, and an electromagnet 61 provided on the N pole side thereof.

The permanent magnet 50 is fixed in a middle portion in the axis line direction of the shaft 15' so that the N pole and the S pole are arranged every 180° around the shaft 15'.

The electromagnets 60 and 61 are provided on the outside of a housing 10', that is, in the atmospheric region so as to be opposed to each other via the shaft 15'.

By controlling the attraction force of the electromagnets 60 and 61 on the permanent magnet 50, the shaft 15' can be moved (turned) in the radial direction.

Thus, in the second embodiment as well, all of the electromagnets (the electromagnets 19b, 60 and 61) having a possibility of producing a vapor pressure when the gate valve 1' are disposed in the vacuum region are disposed in the atmospheric region.

FIG. 11(a) is a view showing a general configuration of the radial driving mechanism for the shaft 15' in the gate valve 1' in accordance with the second embodiment.

In the gate valve 1' in accordance with the second embodiment, a method for setting three positions of fully-closed, half-opened, and fully-opened positions is explained as one example of a method for setting the radial position of the shaft 15'.

As shown in FIG. 11(a), the gate valve 1' includes electromagnets 60a, 60b and 60c constituting the electromagnet 60 for setting the radial rotation position of the shaft 15' and electromagnets 61a, 61b and 61c constituting the electromagnet 61.

The electromagnets 60a, 60b and 60c are provided on the S pole side of the permanent magnet 50, and the electromagnets 61a, 61b and 61c are provided on the N pole side of the permanent magnet 50.

The electromagnet 60a and the electromagnet 61a, the electromagnet 60b and the electromagnet 61b, and the electromagnet 60c and the electromagnet 61c are provided so as to be opposed to each other, respectively, via the center axis of the shaft 15'

In the gate valve 1' in accordance with the second embodiment, the electromagnets are disposed at positions such that the gate valve 1' becomes in a fully-closed state when a current is supplied to the electromagnet 60a and the electromagnet 61a, the gate valve 1' becomes in a half-opened state when a current is supplied to the electromagnet 60b and the electromagnet 61b, and the gate valve 1' becomes in a fully-opened state when a current is supplied to the electromagnet 60c and the electromagnet 61c.

The opening area in the half-opened state of the gate valve 1' is set in advance for each process in the vacuum system using the gate valve 1', and the positions (arrangement angles) of the electromagnet 60b and the electromagnet 61b are determined based on the preset opening area.

Since the opening area in the half-opened state of the gate valve 1' changes each time the process differs, an adjusting mechanism for changing the positions of the electromagnet 60b and the electromagnet 61b is provided.

Hereunder, the adjusting mechanism for changing the positions of the electromagnet 60b and the electromagnet 61b is explained.

Figure 11:
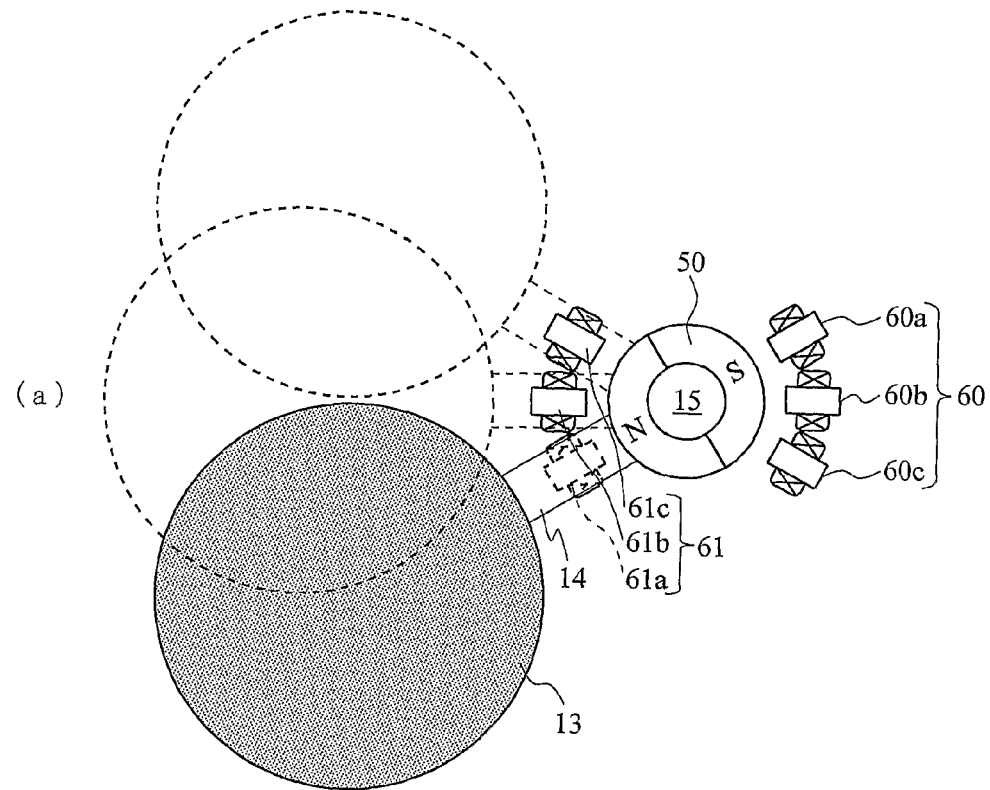
FIG. 11(a) is a view showing a general configuration of a radial driving mechanism for a shaft in a gate valve in accordance with a second embodiment.
FIG. 11(b) is a view showing a general configuration of an adjusting mechanism for changing the positions of electromagnets.
Figure 11:
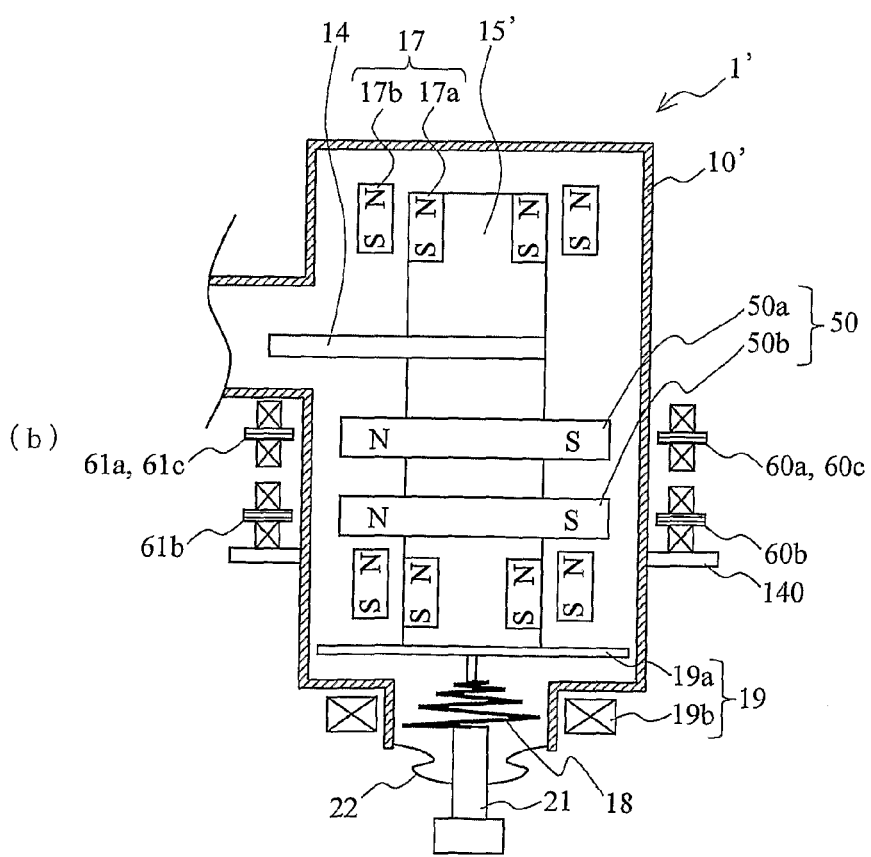

FIG. 11(*b*) is a view showing a general configuration of the adjusting mechanism for changing the positions of the electromagnet 60b and the electromagnet 61b.

As shown in FIG. 11(*b*), in the case where the configuration is made so that the positions of the electromagnet 60b and the electromagnet 61b can be adjusted, the fixed electromagnet consisting of the electromagnets 60a and 60c and the movable electromagnet consisting or the electromagnet 60b and the electromagnet 61b are arranged so as to shift in the axial direction. That is to say, the fixed electromagnet and the movable electromagnet are arranged in two tiers in the axial direction.

Also, the permanent magnet 50 is formed by a fixed permanent magnet 50a and a movable permanent magnet 50b. The fixed permanent magnet 50a and the movable permanent magnet 50b are arranged so that the fixed permanent magnet 50a and the fixed electromagnet, and the movable permanent magnet 50b and the movable electromagnet, respectively, act on each other.

In this embodiment, the fixed electromagnet is arranged at the upper stage, and the movable electromagnet is arranged at the lower stage. The movable electromagnet is arranged so that the electromagnet 60b and the electromagnet 61b are opposed to each other via the shaft 151 on an annular rotating plate 140. By rotating the rotating plate 140, the positions of the electromagnet 60b and the electromagnet 61b can be adjusted.

By providing the radial driving mechanism as shown in FIG. 11(*a*), merely by selecting an electromagnet to which a current is supplied (which is driven), the changeover of the three positions of fully-closed, half-opened, and fully-opened positions can be accomplished easily by open loop control.

However, in this case as well, though not shown, the shaft supporting spring 18 can be used when the shaft 15' is rotated. In this case, the restoring force $F_{ksr}$ of the shaft supporting spring 18 acts. Therefore, a current for applying a tensile force of a degree such that the restoring force $F_{ksr}$ of the shaft supporting spring 18 is negligible is supplied to the electromagnets 60 and 61.

In the above-described method for setting the radial position of the shaft 15', the setting method in which three pairs of electromagnets (the electromagnets 60a to 60c and 61a to 61c) are used as shown in FIG. 11(*a*) has been explained. However, the method for setting the radial position of the shaft 15' is not limited to this method.

Figure 12:
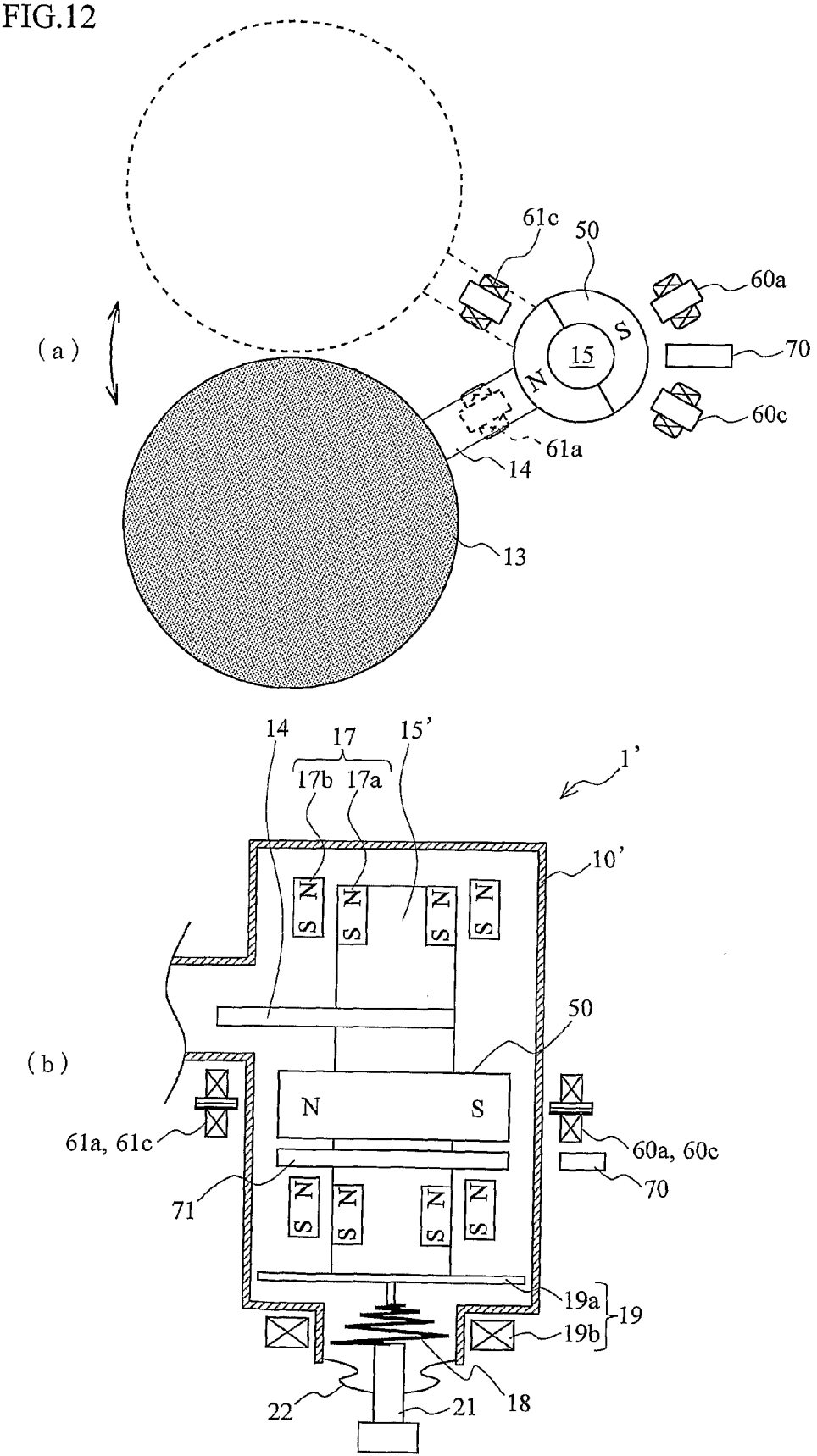
FIG. 12(a) is a view showing a modification of a method for setting the radial position of a shaft.
FIG. 12(b) is a view showing a general configuration of a gate valve provided with a position sensor for detecting the position of the magnetic pole of a permanent magnet.

FIG. 12(*a*) is a view showing a modification of the method for setting the radial position of the shaft 15'.

For example, as shown in FIG. 12(*a*), the gate valve 1' may be made in a half-opened state (intermediate position) by adjusting the current supplied to both of the electromagnets 60a and 61a and the electromagnets 60c and 61c.

In this case, as shown in FIG. 12(*a*), a position sensor 70 is provided to detect the rotation angle of the shaft 15', that is, the position of the magnetic pole of the permanent magnet 50.

Hereunder, the position sensor 70 for detecting the position of the magnetic pole of the permanent magnet 50 is explained.

FIG. 12(*b*) is a view showing a general configuration of the gate valve 1' provided with the position sensor 70 for detecting the position of the magnetic pole of the permanent magnet 50.

As shown in FIG. 12(*b*), the position sensor 70 is provided on the outside of the housing 10 of the gate valve 1', that is, in the region on the atmosphere side.

Also, the shaft 15' is provided with a sensor target 71 forming the target part of the position sensor 70. The sensor target 71 is configured so as to turn in association with the rotation of the permanent magnet 50. The position sensor 70 is configured so as to detect the position of the magnetic pole of the permanent magnet 50 based on the detected rotation angle of the sensor target 71.

Based on the output of the position sensor 70, the adjustment of the current supplied to the electromagnets 60a and 61a and the electromagnets 60c and 61c, that is, feedback control is carried out.

Thereby, the opening area of the gate valve 1' in a half-opened state can be adjusted accurately.

Merely by changing the setting of a target value in feedback control, the opening area of the gate valve 1' in a half-opened state (the rotation angle of the shaft 15') can be set easily.

The radial driving mechanism for the shaft 15' shown in FIGS. 11 and 12 is configured so that the permanent magnet 50 is attracted from both sides by using the electromagnets 60 and 61 to prevent the position of the main axis of the shaft 15' from shifting to one side.

However, the shaft 15' may be rotated by attracting the permanent magnet 50 by using the electromagnet 60 only if the support strength of the shaft 15' can be kept sufficiently by the magnetic bearing 17.

Herein, the case where the rotation position sensor is used has been explained as one example of the method for detecting the position of the magnetic pole of the permanent magnet 50. However, the method for detecting the position of the magnetic pole of the permanent magnet 50 is not limited to this method, and any other encoder, position sensor, or the like may be used.

In the gate valve 1' shown in the above-described second embodiment and modifications thereof as well, the method for pivotally supporting the shaft 15' is not limited to the method in which the conical shaft supporting spring 18 is used, and the pivot bearing shown in FIG. 8 may be used.

In this case as well, the power spring 130 for causing the restoring force $F_{ksr}$ in the rotation direction to act may be provided separately.

Next, a vacuum system such as a semiconductor manufacturing apparatus that uses the gate valve shown in the above-described first embodiment, second embodiment, and modifications thereof is explained.

Figure 13:
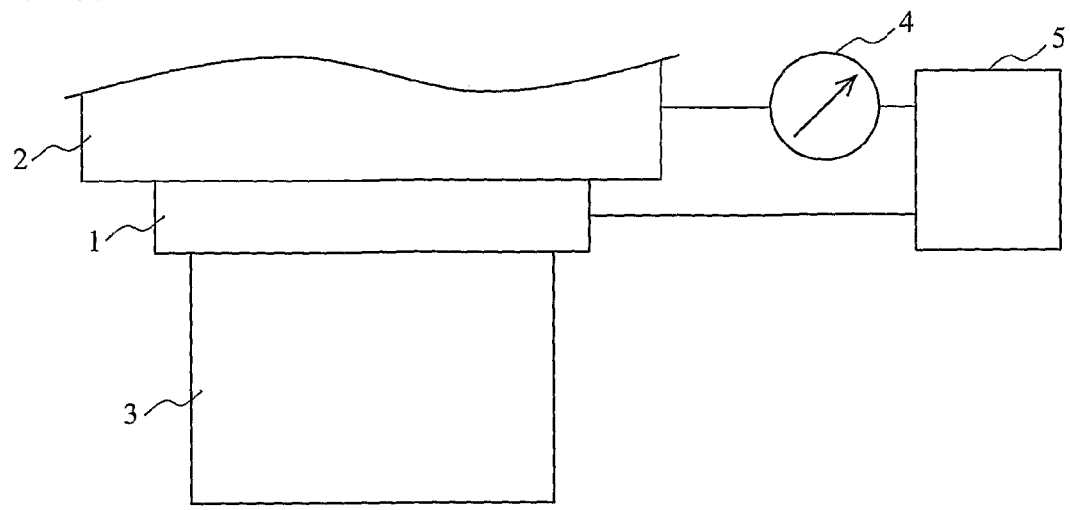
FIG. 13 is a view showing one example of a vacuum system.

FIG. 13 is a view showing one example of the vacuum system.

In FIG. 13, the same reference numerals are applied to elements that are the same as those in the above-described embodiments and modifications thereof, and the detailed explanation thereof is omitted.

As shown in FIG. 13, the vacuum system includes the gate valve 1, the vacuum vessel 2, the vacuum pump 3, a pressure sensor 4, and a controller 5.

The pressure sensor 4 is a sensor for detecting the pressure in the vacuum vessel 2.

The controller 5 is a device for carrying out the control for realizing the APC (Automatic Pressure Control) function in the vacuum system. The controller 5 is connected to the gate valve 1, and also is connected to the vacuum vessel 2 via the pressure sensor 4.

In the vacuum system shown in FIG. 13, the feedback control of the half-opened position (intermediate position) in the gate valve 1 is carried out based on the value detected by the pressure sensor 4 so that the internal pressure of the vacuum vessel 2 takes a predetermined set value.

That is to say, the opening area of the gate valve 1 is adjusted, for example, by controlling the current supplied to the electromagnet 20, the coils 101 to 105, and the electromagnets 60 and 61 so that the internal pressure of the vacuum vessel 2 takes a predetermined set value.

The APC function in this vacuum system is a function of controlling the angle of the slide plate 13 in the gate valve 1, that is, the opening degree of the flow path of gas. This APC function constitutes a part of a CPC (Chamber Pressure Control) function for carrying out the internal pressure control of the vacuum vessel 2 (total control of pressure system)

Next, one example of an exhaust system in which the gate valve 1 shown in the above-described first embodiment, second embodiment, and modifications thereof is combined with the vacuum pump 3 is explained.

Figure 14:
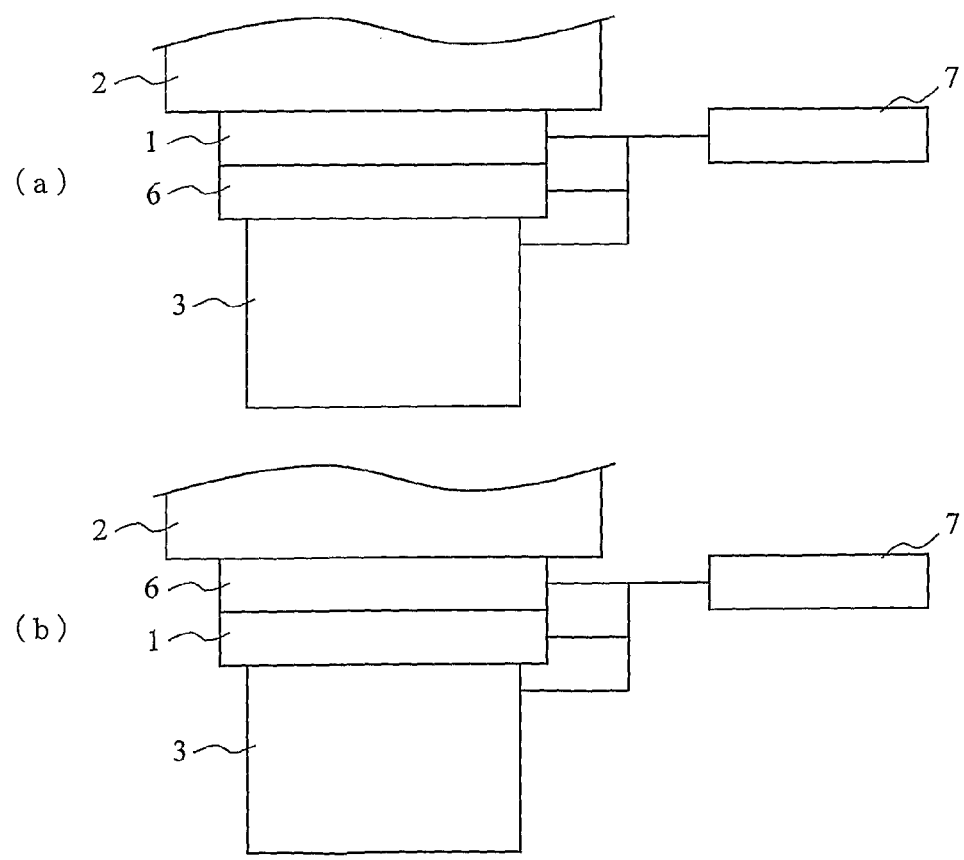
FIG. 14 is a view showing one example of an exhaust system.

FIG. 14 is a view showing one example of the exhaust system.

For example, the exhaust system of the vacuum vessel 2 is formed by assembling the gate valve 1 and a water pump 6 to the vacuum pump 3.

The water pump 6 is a pump for exhausting water vapor in the vacuum vessel 2 at a high speed, and is formed, for example, by a cryopump.

The performance of evacuation of the vacuum vessel 2 depends greatly on the exhaust of water vapor. Therefore, by assembling the water pump 6 to the exhaust system, the time for evacuation of the vacuum vessel 2 can be shortened significantly.

The gate valve 1, the water pump 6, and the vacuum pump 3 constituting the exhaust system are centralizedly controlled.

The exhaust system is provided with the water pump 6 and the gate valve 1 on the upstream side of the suction port of the vacuum pump 3.

The gate valve 1 in the exhaust system may be provided on the upstream side of the water pump 6 as shown in FIG. 14(a), or may be provided on the downstream side of the water pump 6 as shown in FIG. 14(b).

In the case where preference is given to the exhaust performance, the gate valve 1 is preferably provided on the upstream side of the water pump 6 as shown in FIG. 14(a). Also, in the case where preference is given to the exhaust accuracy, the gate valve 1 is preferably provided on the downstream side of the water pump 6 as shown in FIG. 14(b).

In the exhaust system shown in FIG. 14(a), the gate valve 1 and the water pump 6 may be formed integrally. Specifically, the configuration may be made so that the parts of the housings of the gate valve 1 and the water pump 6 are used as a unit.

Also, in the exhaust system shown in FIG. 14(b), the gate valve 1 and the vacuum pump 3 may be formed integrally. Specifically, the configuration may be made so that parts of the housings of the gate valve 1 and the vacuum pump 3 are used as a unit. Also, the configuration may be made so that parts of the housings of the gate valve 1, the water pump 6, and the vacuum pump 3 are used as a unit.

By using the housings as a unit in this manner, the length of the flow path of gas exhausted from the vacuum vessel 2 can further be shortened. Thereby, the exhaust performance of gas can further be improved.

The driving mechanism for the slide plate 13 explained in the above-described first embodiment, second embodiment, and modifications thereof is not used only in the gate valve 1 for adjusting the opening degree (opening area) of the flow path of gas.

Such a driving mechanism for the slide plate 13 may be used, for example, in the movement device for a semiconductor wafer in a semiconductor manufacturing apparatus. Specifically, the driving mechanism is applied to a transfer device in which the semiconductor wafer is placed on the upper surface of the slide plate 13 and is transferred to the next process. In this case, the size of the slide plate 13 is set according to the size of the transferred wafer, and the driving range (movement range) of the slide plate 13 is widened according to the transfer path. Further, an actuator for linearly moving the slide plate 13 is provided as necessary.

Also, the driving mechanism for the slide plate 13 may be used as a shutter function of, for example, a beam device. Specifically, in the beam device for aiming laser beams, quantum beams, electron beams, and the like at a predetermined target, the slide plate 13 is arranged on the irradiation path of beams so that the principal plane thereof intersects the irradiation direction of the beams. By moving the slide plate 13 in the radial direction, the quantity of beams intercepted by the slide plate 13 is changed, by which the irradiation area of beams aimed at the target is controlled, or the irradiation of beams is turned on and off. However, in this case, the slide plate 13 is formed by a member that does not allow beams to transmit.

By using the driving mechanism for the slide plate 13 in this manner, the shutter of the transfer device, the beam device, or the like can be formed by a simple configuration without the use of an actuator having a complicated configuration.

We claim:

1. A plate rotating device comprising:
a rotator having magnetic poles;
a rotation supporting means for supporting the rotator rotatably, the rotation supporting means comprising at least one magnetic bearing;
an electromagnet making magnetic force act on the magnetic poles;
a plate which is fixed on the rotator and is moved by rotation of the rotator;
a control means for adjusting a rotation angle of the rotator by excitation control of the electromagnet; and
a spring biasing the rotator in an axial direction of the rotator, wherein the plate rotating device accommodates the whole of the rotator, the rotation supporting means, and the plate in a housing, which encloses a vacuum space.

2. The plate rotating device of claim 1, wherein
the plate rotating device further comprises a position detecting means for detecting the rotation angle of the rotator; and
the excitation control controls the value of the current which flows in the winding of the electromagnet based on the rotation angle detected by the position detecting means.

3. The plate rotating device of claim 1, wherein
the electromagnet is provided in plural numbers; and
the excitation control selects at least one electromagnet from the plurality of electromagnets, and supplies current to windings of the selected at least one electromagnet.

4. The plate rotating device of claim 1, wherein the electromagnet is provided in a pair so as to be opposed to each other via the rotator.

5. The plate rotating device of claim 1, wherein the arrangement position of the electromagnet can be adjusted.

6. An exhaust path opening degree changing device provided in an exhaust path of an exhausted chamber, wherein
the exhaust path opening degree changing device comprises the plate rotating device of claim 1;
the plate is arranged as the movement path intersects with the exhaust path; and
the control means controls the opening degree of the exhaust path by adjusting the rotation angle of the rotator.

7. An exhausted device comprising:
a vacuum pump for exhausting gas from an exhausted chamber;
the exhaust path opening degree changing device of claim 6, which is provided in the exhaust path of the exhausted chamber;
a water vapor exhaust pump for exhausting water vapor in the exhausted chamber; and
a control unit for centrally controlling the vacuum pump, the exhaust path opening degree changing device, and the water vapor exhaust pump.

8. An exhausted device comprising:
an exhausted chamber;
a vacuum pump for exhausting gas from the exhausted chamber;
the exhaust path opening degree changing device of claim 6, which is arranged in the exhaust path of the exhausted chamber; and
a pressure detecting means for detecting the pressure of gas in the exhausted chamber, wherein the control means adjusts the opening degree of the exhaust path in the exhaust path opening degree changing device based on the gas pressure detected by the pressure detecting means.

9. A transfer device for transferring a member to be transferred, wherein the transfer device comprising:
the plate rotating device according to claim 1, wherein the plate rotating device accommodates the rotator, the rotation supporting means, and the plate in a housing, which encloses a vacuum space, wherein the member to be transferred is placed on the plate, and wherein the control means moves the plate to a transfer destination by adjusting the rotation angle of the rotator.

10. A beam device having an irradiation means for aiming beams at a target, the beam device comprising:
the plate rotating device of claim 1, wherein the plate is arranged as the principal plane thereof intersects the irradiation path of the beams, and wherein the control means changes the quantity of the beams intercepted by the plate by adjusting the rotation angle of the rotator, whereby the irradiation area of beams aimed at the target is controlled.

11. A gate valve which is provided on an upstream side of a suction port of a vacuum pump to open and close a flow path of gas flowing into the vacuum pump, wherein the gate valve comprises:
the plate rotating device of claim 1; and
an actuator for rotatingly driving the rotator, wherein the plate determines the opening area of the flow path of gas by means of the rotation angle of the rotator, wherein the housing has an opening part forming the flow path of gas.

* * * * *